United States Patent Office 3,531,516
Patented Sept. 29, 1970

3,531,516
CERTAIN PEROXIDES HAVING AT LEAST ONE BETA SUBSTITUENT
Orville Leonard Mageli, Kenmore, and Wilbur H. Mc-Kellin, Buffalo, N.Y., assignors to Pennwalt Corporation, a corporation of Pennsylvania
No Drawing. Filed Aug. 1, 1966, Ser. No. 569,037
Int. Cl. C07c 73/02
U.S. Cl. 260—488                     4 Claims

ABSTRACT OF THE DISCLOSURE

An alkanoyl peroxide having at least 3 carbon atoms in one alkanoyl portion and at least one substituent "sub" positioned on a carbon atom which is at least beta to the carbonyl carbon atom, where "sub" is $R_5COO$— and $R_5$ is aliphatic or cycloaliphatic. Example: 2,2-bis(isobutyrl-oxymethyl)propionyl peroxide.

---

This invention relates to substituted alkanoyl peroxides where a substituent is positioned on a carbon atom that is separated from a carbonyl carbon atom by at least one other carbon atom, i.e., is at least beta to that carbonyl carbon atom.

Herein the term "carbonyl carbon atom" refers to the carbon atom in the group

The term "beta to a carbonyl carbon atom" is illustrated by a symmetrical beta substituted caproyl peroxide:

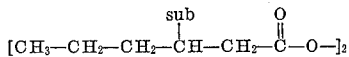

which peroxide is also named: 3-sub-hexanoyl peroxide.

The uses of peroxides as initiators for the polymerization of ethylenic monomers is well known and has found extensive commercial application. The currently available peroxides, while effective, have been found to be limited in their utility because the relationship between the rate of polymerization and the temperature at which the polymerizations are carried out has a determining effect on the properties of the polymers produced. It has been necessary to compromise the properties of the polymer with the rate of polymerization.

Attempts to influence the peroxide reactivity by substitution of various groups on the carbon alpha to the carbonyl group is known to cause a marked decrease in the thermal stability of the peroxides derived from these compounds.

We have now found that by the proper substitution on carbon atoms at least beta to a particular carbonyl group, it is possible to control the thermal stability of peroxides. It is particularly surprising that groups which are known to cause a decrease in thermal stability when substituted on the alpha carbon of the peroxide, show a marked increase in the thermal stability of the peroxide when positioned on at least a beta carbon atom.

As a means of illustrating the changes in the thermal stability of peroxides obtained by the proper substitution on the chain, the time required for half of the peroxide to decompose at a given temperature and in a given solvent is determined as reported in Modern Plastics #6, 142 (1959), D. F. Doehnert and O. L. Mageli. By this substitution we have now found it possible to obtain peroxides with increased thermal stabilities as indicated by half-life. These permit a more precise control of the rates of polymerization since peroxides suitable for a particular desired polymerization rate can be provided.

In addition to controlling the thermal stability of the new peroxides, we have also found that it is possible to obtain the desired effects with more than one type of chemical grouping so that, as desired, it is possible to include substituent groups which are advantageous to the properties of the polymer.

An aspect of the invention is an alkanoyl peroxide having at least 3 carbon atoms in at least one alkanoyl portion and having at least one substituent "sub." A "sub" is positioned on a carbon atom which carbon atom is separated from the carbonyl carbon atom of the "sub" containing alkanoyl at least one other carbon atom. The "sub" substituent is selected from the class consisting of F; Cl; $R_2SO_2$—; $R_3SO$—; $R_4OOC$—; $R_5COO$—;

$(R_6)_2PO$—;

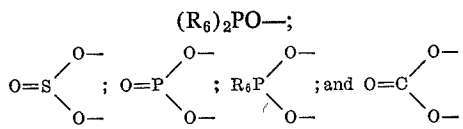

where $R_2$ and $R_3$ are aliphatic, cycloaliphatic, or aromatic; $R_4$ is aliphatic or cycloaliphatic; and $R_5$ and $R_6$ are aliphatic, cycloaliphatic, aromatic, alkoxy or mercapto.

Another aspect of the invention is substituted peroxide having a heterocyclic portion:

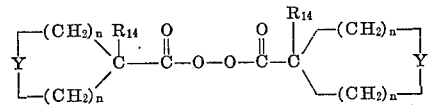

where $n$ is an integer equal to 1–3; and $F_{14}$ is hydrogen or aliphatic. Y is selected from the class consisting of:

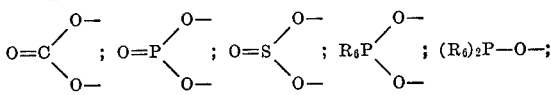

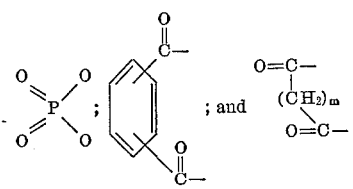

where $m$ is 0–3; and $R_6$ is aliphatic, cycloaliphatic, aromatic, alkoxy or mercapto.

SUBSTITUTED ALKANOYL PEROXIDE

It has been discovered that the position of the hereinbefore defined substituent "sub" relative to the "sub" containing alkanoyl carbonyl carbon atom has a surprising influence on the thermal stability, defined by half-life, of substituted peroxides and the hereinbefore defined "heterocyclic" peroxides. When the substituent "sub" is positioned on a carbon atom which is at least beta to a hereinbefore defined carbonyl carbon atom, the half-life is increased over that of the corresponding non-substituted peroxide. In other words, "sub" is positioned on a carbon atom which is separated from a carbonyl carbon atom by at least one other carbon atom, i.e., the separation between "sub" and the respective carbonyl carbon atom in the case of a beta orientation is two carbon atoms—a gamma orientation represents a separation of three carbon atoms. It appears that any "sub" to carbonyl carbon atom separation of two or more carbon atoms gives a peroxide having a longer half-life. Usually, the peroxide used has a "sub" to carbonyl carbon atom separation of about 2 to 5, i.e. beta to zeta oriented. It appears that the "separation" is the most important influence on the longer half-life of the peroxides of this invention and this feature is controlling regardless of the nature of "sub" or however it is to be understood that the half-life of the peroxide is affected by the nature of "sub" present therein.

The peroxide of the invention may be symmetrical or unsymmetrical; only one alkanoyl group need have at least three carbon atoms, that is, be able to afford at least a beta oriented "sub." It is preferred that each alkanoyl group be able to afford such a "sub." It is to be understood that the invention includes peroxides having more than 2 alkanoyl groups, i.e., polymeric peroxides.

An illustration of peroxides coming within this aspect of the invention are the beta substituted propionyl peroxides:

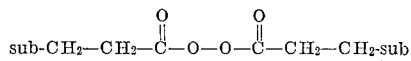

and by beta substituted pivalyl peroxide:

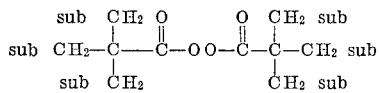

and also:

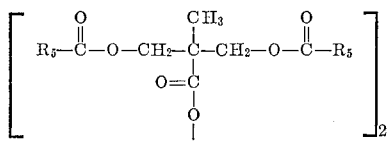

Especially of interest are those peroxides: where each alkanoyl portion has 3–10 carbon atoms; or "sub" is chloro or acyloxy having 1–8 carbon atoms or alkoxy carbonyl.

ESTERS OF SUBSTITUTED PEROXIDES ACID HAVING A HETEROCYCLIC PORTION

These peroxides have been defined earlier as another aspect of this invention. An illustrative peroxide is:

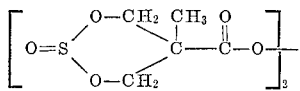

PREPARATIONS

The hereinbefore defined peroxides are made readily by the Schotten-Bauman type of procedure in which the acid chloride or anhydride is treated with hydrogen-peroxide in the presence of aqueous alkali, tertiary amine or pyridine: Organic Peroxides—Davies 1961( Butterworths) pp. 58–59; Berichte 17, 2544 (1884); Berichte 19, 3218; Organic Preparations—Weygand (New York 1945) p. 10; J. Argi. Chem Soc. (Japan) 27 674 (1953) C.A. 49, 7527a.

ILLUSTRATIVE COMPOUNDS

EXAMPLE 1

2,2-bis(isobutyryloxymethyl)propionyl Peroxide

The addition of 29.3 g. (0.1 mole) of 2,2-bis (isobutyryloxymethyl)propionyl chloride to a mixture of 4.0 g. (0.059 mole) of 50% hydrogen peroxide solution, 10.8 g. (0.142) mole) of 50% sodium hydroxide solution, 25 ml. of ether and 30 ml. of water was carried out at 0 to 3° C. over 15 minutes. After an additional stirring time of 45 minutes at 0° C., the aqueous layer was separated, the ethereal solution of the product washed with water and dried over anhydrous magnesium sulfate. Removal of the ether under reduced pressure gave 24.2 g. of the product having a purity of 77% as determined by active oxygen assay.

EXAMPLE 2

3-chloropropionyl peroxide

A mixture of 24.8 g. (0.31 mole) of 50% sodium hydroxide solution, 10.5 g. (0.15 mole) of 50% hydrogen peroxide solution and 15 ml. of benzene was stirred at 10–150° C. while 38.1 g. (0.30 mole) of 3-chloropropionyl chloride was added over 45 minutes. The reaction mixture was then allowed to warm to 30–35° C. and stirred for a total reaction time of 3 hours. The benzene solution of the product was separated, after the reaction mixture was diluted with 50 ml. of water to dissolve the salt formed, and washed with sodium carbonate solution and water. Removal of the benzene under vacuum left 22.3 g. of product assaying 85.8% by active oxygen assay.

By passing a methylene chloride solution of the product through a column of chromatographic grade alumina and stripping the solvent, 3-chloropropionyl peroxide assaying 94.3% by active oxygen assay was obtained.

Half-life at 70° C. in 0.2 molar solution in benzene was 9.2 hours; propionyl peroxide was 4.3 hours.

EXAMPLE 3

4-chlorobutyryl peroxide

A solution of 28.2 g. (0.20 mole) of 4-chlorobutyryl chloride dissolved in 25 ml. of pentane was added over 20 minutes to a stirred mixture of 8.0 g. (0.118 mole) of 50% hydrogen peroxide solution, 22.6 g. (0.284 mole) of 50% sodium hydroxide solution and 40 ml. of water at 0° C. After stirring for 15 minutes at 0° C., 75 ml. of ether was added, the solvent layer separated and washed with water and dried over anhydrous magnesium sulfate. Removal of the volatiles under reduced pressure gave 16.7 g. of product assaying 98% pure by active oxygen assay and 97% pure by assay for chlorine content.

Half-life at 70° C. in 0.2 molar solution in benzene was 9.8 hours.

EXAMPLE 4

β-Chloroisobutyryl peroxide

A solution of 28.2 g. (0.2 mole) of β-chloroisobutyryl chloride dissolved in 25 ml. of ether was added over 35 minutes to a stirred mixture of 8.0 g. (0.118 mole) of 50% hydrogen peroxide solution, 21.6 g. (0.274 mole) of 50% sodium hydroxide solution, 60 ml. of water and 25 ml. of ether held at —3° C. After stirring for 10 minutes, 25 ml. more of ether was added and the ether layer separated, washed with water, and dried over anhydrous magnesium sulfate. Removal of the ether under reduced pressure left 16.3 g. of β-chloroisobutyryl peroxide determined to be 92% pure by active oxygen assay.

Half-life in odorless mineral spirits at 30° was 37.7 hours, isobutyryl peroxide half-life was 17.1 hours.

EXAMPLE 5

3-phenylsulfonylpropionyl peroxide

The addition of 23.2 g. (0.1 mole) of 3-phenylsulfonyl propionyl chloride in 125 ml. of benzene to a stirred mixture of 3.75 g. (0.055 mole) of 50% hydrogen peroxide solution, 8.8 g. (0.11 mole) of 50% sodium hydroxide solution and 25 ml. of benzene was carried out at 20–25° C. After stirring for 45 minutes at 28° C. the reaction mixture was poured into 200 ml. of water and the benzene layer separated and washed. Removal of the solvent under reduced pressure left the product which was purified from a mixture of ethyl acetate and ether. Active oxygen assay indicated a purity of 92%.

Polymerization of styrene at a concentration of $5.15^{-4}$ moles/deciliter at 70° C. gave a 3% rate of $2.74 \cdot 15^{-3}$ m./l./min.

EXAMPLE 6

3-propionoxy propionyl peroxide (1) Preparation of hydracroyl peroxide: To a well stirred mixture of 9.6 g. (0.2 mole) $H_2O_2$ (70%) and 1 g. $KOOCCH_3$ cooled at 0±1° C. was added dropwise 29.6 g. (0.4 mole) β-propiolactone (97%) over a period of 20 minutes.

After the addition was completed the mixture was stirred for one hour at 4±1° C.

After this time to the reaction mixture was added 6 g. $(NH_4)_2SO_4$, 6 g. $Na_2CO_3$, 6 g. $MgSO_4$, (anhydrous) and stirred at 4±1° C. for 5 minutes.

The mixture was filtered off and the filtrate was diluted with 250 ml. of acetone.

The solid that separated was filtered and the acetone evaporated under reduced pressure.

A colorless liquid was obtained 27.8 g. Theor. yield 35.6 or 78%. Active oxygen determination gave 8.92%. Theor. 8.97%. This sample was refrigerated until ready for use.

(2) Esterification reaction: To a well stirred solution of hydracroyl peroxide 17.8 g. (.1 mole) in 150 ml. of acetone and 15.8 g. (.2 mole) pyridine cooled at 0±1° C. was added dropwise 20.4 g. (.2 mole+10% excess) propionyl chloride.

The mixture was stirred for one hour at 0±1° C. after the addition was completed.

The pyridine HCl was filtered off and the ether layer was washed with 10% tartaric acid solution then $H_2O$ to neutral, fried over anhydrous $MgSO_4$, filtered and the solvent evaporated under reduced pressure.

A yield of 10 g. was obtained.

Active oxygen determination gave 5.23%. Theor. active oxygen 5.52% or 95% pure.

Half-life at 70° C. in benzene was 3.3 hours.

EXAMPLE 7

2,2-bis(acetoxymethyl) propionyl peroxide

A solution of 23.6 g. (0.1 mole) of 2,2-bis (acetoxymethyl) propionyl chloride dissolved in 20 ml. of ether was added over 20 minutes to a mixture of 4.0 g. (0.059 mole) of 50% hydrogen peroxide solution, 10.8 g. (0.142 mole) of 50% sodium hydroxide solution and 30 ml. of water stirred at 0%.

The reaction mixture was stirred for 30 minutes after the addition was complete, the ethereal layer separated and washed with sodium bicarbonate solution and water, and then dried over anhydrous magnesium sulfate. Removal of the ether under reduced pressure gave 12.2 g. of product having a purity of 87.5% by active oxygen assay.

Thus having described the invention what is claimed is:

1. A dialkanoyl peroxide having 3 to 10 carbon atoms in each alkanoyl portion and containing 1 to 6 $R_5$—COO— substituents, wherein $R_5$ is alkyl having 1 to 7 carbon atoms; each of said substituents being positioned on a different carbon atom which carbon atom is separated from the carbonyl group of said alkanoyl portion by at least one other carbon atom.

2. The peroxide of claim 1 having the formula

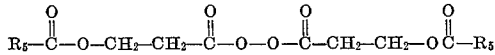

3. A pivalyl peroxide:

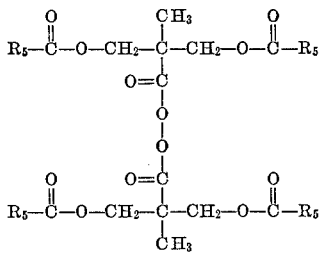

where $R_5$ is alkyl having 1–7 carbon atoms.

4. 2,2-bis(isobutyryloxymethyl) propionyl peroxide.

References Cited

UNITED STATES PATENTS

| | | | |
|---|---|---|---|
| 3,222,327 | 12/1965 | Guillet et al. | 260—80 |
| 3,108,093 | 10/1963 | Pajaczkowski et al. | 260—89.5 |

OTHER REFERENCES

Milas et al.: Chemical Abstracts, vol. 27 (1933), page 972.

Goldschmidt et al.: Chemical Abstracts, vol. 55 (1961), page 18585c.

Leffler et al.: Chemical Abstracts, vol. 58 (1963), page 5509b.

JAMES A. PATTEN, Primary Examiner

U.S. Cl. X.R.

260—80, 327, 340.2, 453, 463, 468, 469, 481, 487, 937